United States Patent Office 3,201,435
Patented Aug. 17, 1965

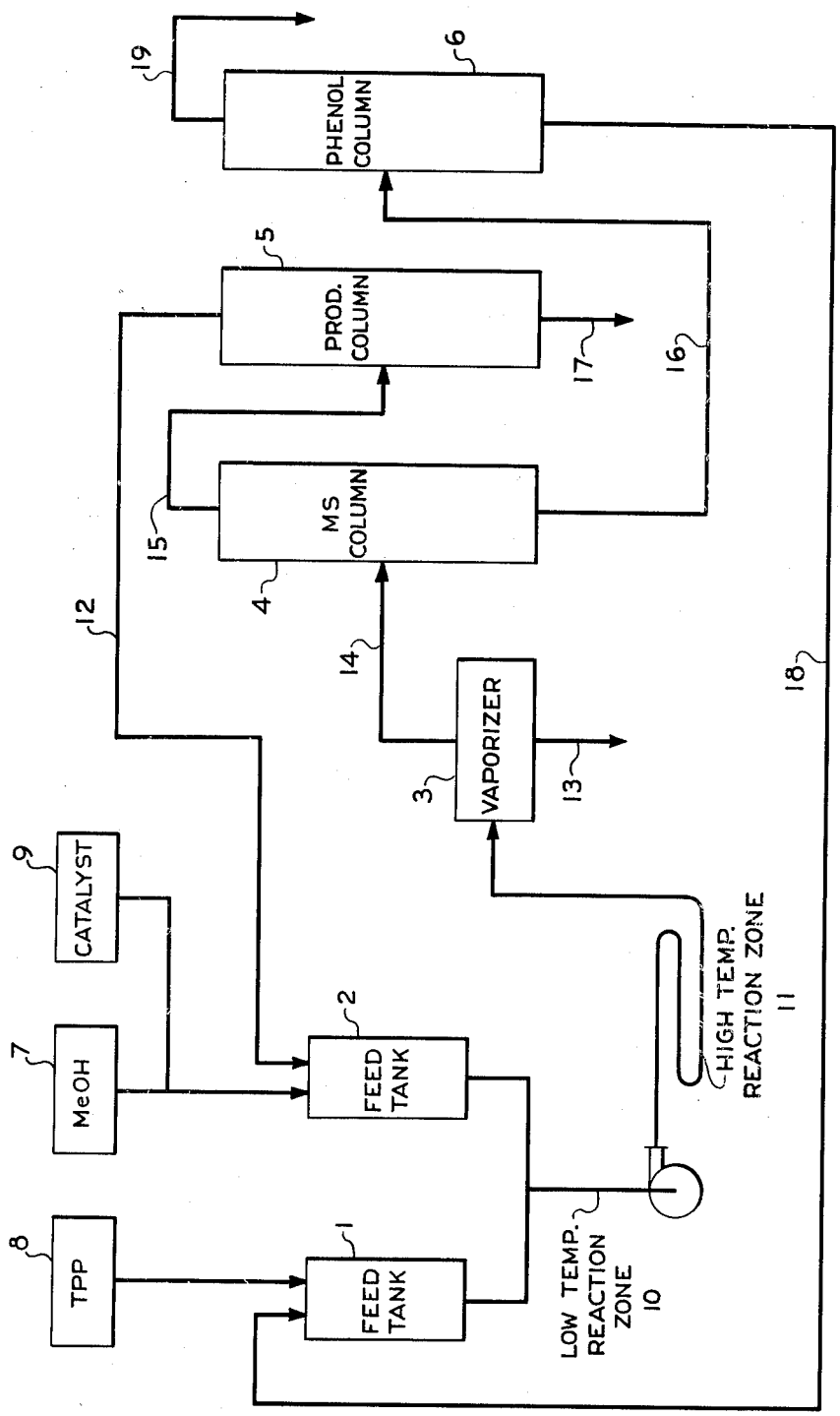

3,201,435
PROCESS FOR THE PRODUCTION OF TRIMETHYL PHOSPHITE
Arthur C. Schulz, North Tonawanda, N.Y., assignor to Hooker Chemical Corporation, Niagara Falls, N.Y., a corporation of New York
Filed Jan. 29, 1962, Ser. No. 174,334
21 Claims. (Cl. 260—461)

This invention relates to a process for the production of phosphorus compounds. More particularly, this invention is concerned with the production of trimethyl phosphite in high yield and conversion.

The process of this invention is concerned with the production of trimethyl phosphite in desirably high yield and conversion by continuous isolation of trimethyl phosphite or trimethyl phosphite-methanol mixtures from an alkaline transesterification mixture of an aryl phosphite and methanol using procedures and conditions which minimize the formation and handling of by-products which are not usable in the synthesis of trimethyl phosphite.

In the preparation of trimethyl phosphite by transesterification of an aryl phosphite and methanol in the presence of an alkaline catalyst, and in the subsequent isolation of trimethyl phosphite, some reactant components combine with the alkaline catalyst to form complex salts. These complex salts are present in the reaction mixture principally as solids, semi-solids and/or dissolved solids, and tend to interfere with the primary objective of the procedure of this invention, viz., the preparation and the isolation of trimethyl phosphite, by ultimately blocking the apparatus and process system. These salts hinder both synthesis and continuous isolation and, if allowed to accumulate in the process, can require that the system be shut down for clean-out and disposal of these non-reusable by-products. Other reaction by-products are also formed which, although they do not react with the alkaline catalyst, are difficult to efficiently remove from reusable process chemicals. In disposing of such non-reusable by-products (as mentioned above), substantial losses of the end product, trimethyl phosphite, can occur. Also, substantial amounts of the phenol and of trivalent phosphorus compounds which could transesterify to produce trimethyl phosphite can be lost by co-disposal along with non-reusable by-product waste. Up to this time an efficient means for separating the non-reusable by-products from trimethyl phosphite and reusable by-products has not been developed in the prior art.

The process of the present invention provides a means of achieving a high efficiency in the separation of non-reusable by-products from trimethyl phosphite and reusable by-products and thereby a highly efficient transesterification route to trimethyl phosphite can be achieved. Not only is the production of non-reusable by-products maintained at a low rate, but also, the reusable by-products, including those which can be recycled directly for use as initial reactants to prepare more trimethyl phosphite, are recovered in reusable form almost quantitatively. Thus, the pressing problem of disposal of non-reusable by-products and the recovery of reusable by-products while at the same time synthesizing trimethyl phosphite in high yield and conversion is solved in a highly efficient fashion by the process of this invention. The process of this invention is highly efficient in that production of non-reusable by-products is minimized while the recovery of trimethyl phosphite and reusable by-products is maximized. By proceeding according to the instant invention, loss of trimethyl phosphite, the phenol, and the reusable trivalent phosphorus compounds which are present in small proportions in a discarded non-reusable by-product stream is so minute as to be virtually negligible.

By proceeding according to the present invention, trimethyl phosphite can be produced and recovered continuously for an indefinitely long period, while the non-reusable by-products can be continuously removed, and the reusable trivalent phosphorus-containing by-products can be continuously recycled back to the initial reaction. The commercial importance and efficacy of the instant invention will be readily apparent when it is realized that trimethyl phosphite can be continuously produced at yields in excess of ninety percent when using the preferred process of this invention.

The term "aryl phosphite" as used in this disclosure is to be construed to mean a phosphite derived from any one or combination of the following compounds: an aryl-substituted phosphite selected from the group consisting of aryl dimethyl phosphite, diaryl methyl phosphite, triaryl phosphite, and mixtures thereof, wherein the aryl group can be phenols.

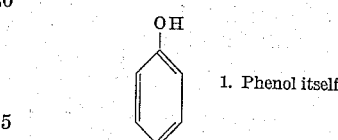
1. Phenol itself

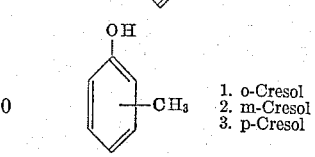
1. o-Cresol
2. m-Cresol
3. p-Cresol

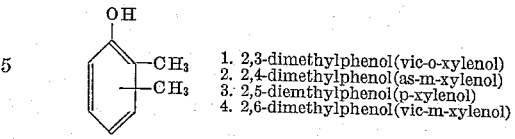
1. 2,3-dimethylphenol (vic-o-xylenol)
2. 2,4-dimethylphenol (as-m-xylenol)
3. 2,5-diemthylphenol (p-xylenol)
4. 2,6-dimethylphenol (vic-m-xylenol)

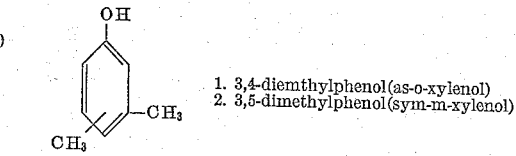
1. 3,4-diemthylphenol (as-o-xylenol)
2. 3,5-dimethylphenol (sym-m-xylenol)

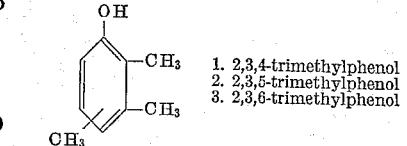
1. 2,3,4-trimethylphenol
2. 2,3,5-trimethylphenol
3. 2,3,6-trimethylphenol

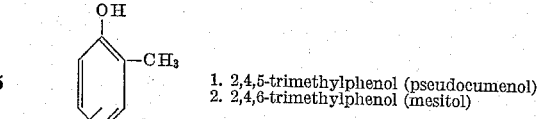
1. 2,4,5-trimethylphenol (pseudocumenol)
2. 2,4,6-trimethylphenol (mesitol)

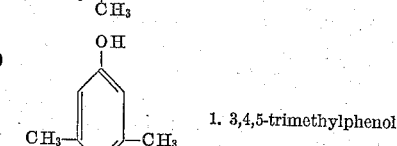
1. 3,4,5-trimethylphenol

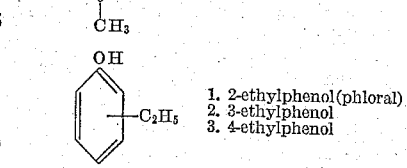
1. 2-ethylphenol (phloral)
2. 3-ethylphenol
3. 4-ethylphenol

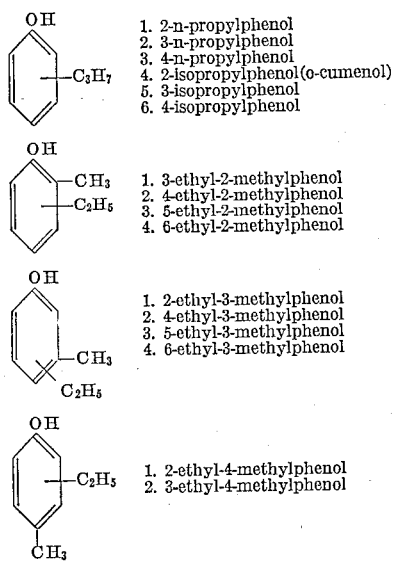

While the process below is described in terms of triphenyl phosphite as the aryl phosphite, it should not be construed that the scope of this disclosure is limited to triphenyl phosphite as the aryl phosphite.

The process of this invention can be obtained by transesterifying the triaryl phosphite with a monohydroxy aliphatic hydrocarbon in the presence of a small but catalytically effective amount of a metal alcoholate or metal phenolate.

As the metallic alcoholate or phenolate there are preferably employed the alkaline metal salts of an alcohol or phenol. Typical examples are sodium methylate, lithium methylate, potassium methylate, sodium ethylate, sodium isopropylate, sodium dodecylate, sodium cetylate, sodium octadecylate, sodium phenolate, potassium phenolate, sodium cresylate, and so forth. There can also be used metal alcoholates such as calcium ethylate, etc. In the process of this invention there can also be employed strong organic bases as the catalyst. Typical of such bases are quaternary ammonium hydroxides, such as trimethyl benzyl ammonium hydroxide and substituted guanidines, such as pentamethyl guanidines, for example. The organic base can be employed in the same proportions as the metal alcoholates and phenolates.

Strong inorganic bases such as sodium hydroxide and potassium hydroxide also are suitable and can be employed in the same amount as the alcoholates and phenolates. However, weaker inorganic base acting materials such as sodium carbonate are ineffective.

The process of this invention can be considered as occurring in essentially six steps. The first step involves an initial synthesis step wherein the triaryl phosphite and sufficient methanol are contacted in the presence of an alkaline catalyst, for example, sodium methyl alcoholate, or any of the above-indicated catalysts, at relatively low temperatures and pressures for a sufficient period of time to allow the transesterification reaction to go to partial completion. It is in this step that the substantial majority of the transesterification can take place when the proper relation is observed between the control factors of temperature, pressure, holding time and the reactant ratios.

In the next step, the reaction mixture, including by-products of the initial reaction step, is passed under superatmospheric pressure to a heated, non-backmix type of reactor, such as a heated pipe or the heated tubes of a shell and tube heat exchanger, to complete the reaction. It is in this second step (final reaction step), that the remainder of the trimethyl phosphite is produced. Although it is not important whether the reaction occurs principally in the initial reaction step or in the final reaction step, it is important to the efficiency of the subsequent isolation step that essentially all the triphenyl phosphite has been converted to trimethyl phosphite by the time the reaction mixture leaves the final reaction step (Step 2). It is also not important whether the reaction is conducted in part or in whole in a batchwise manner, so long as essentially complete conversion of the triphenyl phosphite to trimethyl phosphite has occurred prior to the Step 3 processing.

The third step involves a continuous substantially total concomitant flash vaporization of the trimethyl phosphite and other process compounds, including methanol and phenol, and is the single most important step in this invention. Where the prior art of making trimethyl phosphite by transesterification has, to this time, required a vaporization of essentially only the trimethyl phosphite and methanol from the reaction mixture, the instant invention requires essentially total vaporization of the entire reaction product stream including not only the methanol and trimethyl phosphite, but also the phenol and small quantities of trivalent phosphorus-containing compounds other than trimethyl phosphite. By so doing, a very small quantity of vaporization residue, which is a highly concentrated mixture of essentially non-volatile, non-reusable by-products, can be secured for disposal with essentially no loss of phenol and trivalent phosphorus-containing compounds.

The vapors from the substantially total vaporization, which contain small quantities of trivalent phosphorus-containing compounds other than trimethyl phosphite, are passed on through a partial condenser to a fractional distillation zone wherein the fourth step of the process takes place.

The fourth step of this invention involves continuously fractionally distilling trimethyl phosphite, methanol, phenol and other reusable trivalent phosphorus-containing compounds to separate the trimethyl phosphite and methanol from the phenol and other reusable trivalent phosphorus-containing compounds. The trimethyl phosphite and methanol are recovered as a distillate from the upper portion of the column as a combined fraction, while the phenol and other reusable trivalent phosphorus-containing compounds are recovered from the lower portion of the column.

The fifth step of the process involves fractional distillation of the methanol-trimethyl phosphite distillate to recover separate streams of methanol and trimethyl phosphite. This distillation can be conducted either batchwise or continuously. The methanol is removed from the upper portion of the distillation column, and the desired end product, trimethyl phosphite, is removed from the bottom portion of the distillation column. The methanol from the top of the distillation column can then be either recycled directly back to the initial reaction and therefore constitute a source of methanol to said initial reaction, or, it can be passed to a reactor where it is reacted with sodium to produce sodium methylate if sodium methylate is being used as the alkaline catalyst.

The sixth step involves fractional distillation of the stream containing the phenol and trivalent phosphorus-containing compounds recovered from the column described in Step 4. The trivalent phosphorus-containing compounds include triphenyl phosphite, trimethyl phosphite, diphenyl-monomethyl phosphite, and dimethyl monophenyl phosphite. This phenol-containing stream can be subjected to either a batch or continuous distillation, wherein essentially pure phenol can be recovered for use in producing more triphenyl phosphite. This triphenyl phosphite can then in turn be cycled back to the initial trimethyl phosphite reactor. The bottom stream of the phenol fractionation column contains trivalent phosphorus compounds. This stream can be combined with methanol to produce more trimethyl phosphite.

INITIAL REACTION STEP

For conducting a continuous synthesis of trimethyl phosphite, the initial reaction can be conducted at a temperature of from about twenty-five degrees centigrade to and including the boiling point of the methanol and trimethyl phosphite in the transesterification mixture, and more preferably about sixty-six degrees centigrade using essentially atmospheric pressure and a sufficiently long reactor holding time to enable the transesterification to go to a substantial degree of completion, viz., eighty to ninety-five percent. The initial reaction should be conducted under alkaline conditions (as measured by water-moistured pH paper). The alkaline catalysts which can be used in the process of this invention include those catalysts which were mentioned above. The time required to secure the desired degree of completion of the transesterification reaction in the initial reaction step is inversely proportional to the temperature of the reacting mixture. If a heat input to the reactor is set such that the total vapor pressure in the reaction vessel housing the initial transesterification reaction exceeds atmospheric pressure, then the system can either be put under superatmospheric pressure or a condenser can be used to insure a condition of total reflux. The preferred procedure is to conduct the entire initial reaction under a condition of total reflux at the boiling point of the transesterification mixture.

THE SECOND REACTION STEP (FINAL REACTION STEP)

The second reaction stage for a continuous process using this invention is conducted at temperatures of from about sixty-five degrees centigrade to about one hundred and twenty-five degrees centigrade under a pressure of from atmospheric to about one hundred pounds per square inch gauge, for a period of from about five minutes to about one-half hour. Preferably, the second stage of the transesterification reaction is performed at temperatures of from about ninety to about one hundred and five degrees centigrade using a superatmospheric pressure of from about forty to about fifty pounds per square inch gauge, for a period of time of from about five to about fifteen minutes in order to achieve the full measure of the transesterification reaction, while at the same time minimizing the production of non-reusable by-products. An important consideration in conducting the second reaction step is to prevent unconverted reactants from by-passing the transesterification reaction and continuing unreacted to the vaporization step.

SUBSTANTIALLY TOTAL FLASH VAPORIZATION STEP (THIRD STEP)

During the third step of the process, viz., the total vaporization step; trimethyl phosphite, methanol, trivalent phosphorus-containing compounds and phenol are vaporized at the same time. A flash type or single-pass type vaporization is preferred, wherein the effluents from the second or final reaction step are vaporized at a temperature of from about fifty degrees to about one hundred and fifty degrees centigrade under an absolute pressure of from about forty to about seven hundred and fifty millimeters of mercury. It should be observed that the flash vaporization step should be conducted over as short a period of time as possible, because during the flash vaporization step conditions are favorable for the formation of back-transesterification by-products and non-reusable by-products. By conducting the flash vaporization step at approximately one hundred degrees centigrade, under an absolute pressure of about forty-five millimeters of mercury, it is possible to substantially complete the total vaporization of the four primary materials of interest, viz., the trimethyl phosphite, the methanol, the phenol, and the other trivalent phosphorus-containing compounds, while at the same time encountering only a small amount of back-transesterification and trivalent phosphorus degradation, thus conserving the trivalent phosphorus in the desired trimethyl phosphite form. The vaporization temperature is quite important from the standpoint of by-product formation. A small amount of by-product residue, including both reusable by-products and non-reusable by-products, will accumulate in the vaporization vessel. The holding line of this vaporization residue is also important from the standpoint of non-reusable by-product formation. Although this residue can be held in the vaporization vessel for ninety-six hours, or even longer, the aim should be to keep this holding time to eight hours or less. It is important that the liquid and solid residues building up in the vaporization vessel be kept alkaline or at least neutral at all times. This can be readily accomplished by adjusting the amount of alkaline catalyst used in the initial stage of the reaction. If the pH of the vaporization vessel by-product residue should become strongly acidic, the production rate of non-reusable by-products will be increased, thus reducing the efficiency of the continuous process. The vaporization step provides an efficient means for separation of phosphonates and sodium-phosphorus complex salts from the product and reusable by-products.

FRACTIONAL DISTILLATION (FOURTH STEP)

The vaporized trimethyl phosphite, methanol, phenol, and reusable trivalent phosphorus by-products from Step 3 are then passed to the first fractional distillation step wherein methanol and trimethyl phosphite are separated from phenol and trivalent phosphorus-containing compounds present in the phenol. From this fractional separation column, methanol and trimethyl phosphite, together with trace impurities, are removed as a distillate, and phenol along with reusable by-product compounds containing trivalent phosphorus, as well as other trace impurities, is removed as a bottom stream.

It is preferable to conduct the fractional distillation step in the methanol stripping column (the aforementioned fractional distillation column, at low pressures such as, for example, from about forty-five millimeters of mercury absolute to about two hundred and twenty-five millimeters of mercury absolute, because the majority of trivalent phosphorus compounds in the phenol would otherwise be decomposed and therefore lost for further use. The distillation must be controlled to keep the phenol content in the distillate at a very low level.

FIFTH STEP (FRACTIONAL DISTILLATION OF METHANOL AND TRIMETHYL PHOSPHITE)

The distillate coming from the top of the methanol stripping column characteristically has a trimethyl phosphite content of about twenty-five percent or higher. The methanol-trimethyl phosphite mixture can then be subjected to a further fractional distillation step to give a residue of high concentration trimethyl phosphite, eighty-five to ninety-nine percent by weight trimethyl phosphite, with anisole as a principal contaminant, and a distillate predominating in methanol and containing about seven to ten percent trimethyl phosphite which can be recycled back to the initial reaction. The distillation column used to conduct this step is designated "the Product Column."

The methanol stripping column distillate can alternatively be mixed with an azeotroping agent, e.g., cyclohexane, n-heptane, etc., which forms a two-phase distillate with methanol, and then subjected to a separate fractional distillation. The methanol in the mixture can thereby be removed as an azeotropic distillate. The bottom stream from this distillation consists essentially of high purity trimethyl phosphite. The two-phase azeotrope of methanol and azeotroping agent can be either returned to the initial reaction step as a source of methanol or can be separated by decanting, and the methanol-rich phase submitted to further fractionation from which the methanol can be recovered as a bottom stream suitable for recycle to the transesterification reaction, and from which the azeotroping agent can be recovered as an azeotropic distillate. The azeotroping agent-rich phase from the decanter is suitable for reuse in admixture with fresh distillate from the methanol stripping column.

If a suitable methanol azeotroping agent is chosen which forms a single phase azeotrope, then this azeotrope can be cycled back from the trimethyl phosphite recovery distillation described above to the initial reaction step to serve as a source of methanol.

SIXTH STEP (FRACTIONAL DISTILLATION OF PHENOL AND REUSABLE TRIVALENT PHOSPHORUS CONTAINING COMPOUNDS)

The bottom stream from the methanol stripping column which contains phenol and trivalent phosphorus compounds along with trace impurities of non-reusable by-products can be subjected to a separate fractional distillation to yield a high concentration of phenol, with anisole as the chief contaminant, and a distillation residue containing predominantly diphenyl monomethyl phosphite and triphenyl phosphite, which can be recycled back to the initial reaction to serve as a source of trivalent phosphorus for transesterification to trimethyl phosphite. The distillation column used to conduct this step is designated "the Phenol Column."

The following examples are presented to define the invention more fully without any intention of limiting the invention to the specific ingredients, proportions, and conditions specified therein. All parts and percentages are by weight unless otherwise indicated.

*Example 1.*—(*Batch reaction with continuous production of by-product-free, crude trimethyl phosphite and crude phenol streams*)

This example demonstrates the ability of the "total vaporization" step to efficiently separate waste reaction products from a transesterification reaction mixture, and employs a distillation column in combination with a vaporizer to provide clean streams of trimethyl phosphite in methanol and trivalent phosphorus-containing compounds in phenol, said streams being essentially free of non-reusable by-products.

Periodically, one thousand, five hundred and fifty parts by weight of triphenyl phosphite, eleven hundred parts by weight of methanol, and 23.5 parts by weight of sodium methylate were mixed together in a reaction vessel, and allowed to stand at room temperature for a period of about sixteen hours. This mixture was then continuously metered to a vaporizer which was maintained at an absolute pressure of two hundred and twenty-five millimeters of mercury. The partial vacuum in the vaporizer was maintained by holding the same partial vacuum in the methanol stripping distillation column. The contents of the vaporizer were maintained at about one hundred and twenty-nine degrees centigrade. The liquid level of the vaporizer contents was maintained constant by withdrawing the steady state formation rate of waste by-products. The vapors leaving the vaporizer passed to the methanol stripping column from which trimethyl phosphite and methanol were recovered as a distillate, and phenol with trivalent phosphorus-containing compounds was recovered as a bottom stream product. Both of these streams were clear, colorless, essentially free of resinous material and sodium salts and contained essentially none of the non-reusable by-products of the transesterification reaction. The temperature at the top of the methanol stripping column was about forty-two degrees centigrade and the temperature at the bottom thereof was about one hundred and forty-four degrees centigrade. The trimethyl phosphite content of the distillate was thirty-four to forty weight percent, and the trivalent phosphorus content of the bottom stream was the calculated molar equivalent of ten to twenty weight percent of diphenyl methyl phosphite.

Of the phosphorus fed as triphenyl phosphite to the vaporizer, about seventy percent was recovered as trimethyl phosphite in the methanol stripping column distillate, and part of the remaining percentage was recovered as reusable trivalent phosphorus compounds in the methanol stripping column bottom stream. The phosphorus loss in the vaporizer bottom stream amounted to only a small percentage of the phosphorus fed. The concentration of non-reusable by-products in the vaporizer residue was so high as to cause the residue stream to be highly viscous.

*Example 2.*—(*Batch reaction, continuous trimethyl phophite recovery employing a vaporizer pressure of 225 mm. of mercury absolute*)

This example illustrates the effects achieved by combining the total vaporization step with additional processing steps to provide a continuous trimethyl phosphite recovery system with internal recycling of streams of methanol and trivalent phosphorus-containing compounds.

Once each twenty-four hours, approximately one thousand, nine hundred and forty parts by weight of triphenyl phosphite, thirty-seven parts by weight of sodium methylate, and seven hundred and fifteen parts by weight of methanol were charged to a reaction vessel. In addition, the accumulated recycle phosphorus stream, about four hundred and seven parts by weight (recovered from the previous twenty-four hour operating period of the trimethyl phosphite recovery system) was also fed to the said reaction vessel. The contents of the reaction vessel was stirred to achieve a homogeneous solution. Aside from the slight temperature rise, due to the initial high reaction rate, the contents of the reaction vessel remained at room temperature. The contents of the reaction vessel was then used periodically as necessary to refill the feed tank of the vaporizer when the level in the feed tank seemed sufficiently low.

The mixed feed, prepared as above, was continuously metered to the vaporizer at a rate of about one hundred and twenty-nine parts by weight per hour. In addition to this mixed feed, a recycle methanol stream of the product column distillate was continuously fed to the vaporizer. This recycle methanol stream was neither stored nor metered, but was allowed to flow directly to the vaporizer as soon as it was produced from the product column.

The liquid "heel" in the vaporizer was maintained at a temperature of one hundred and twenty-five degrees centigrade and the pressure in the vaporizer was maintained at about two hundred and twenty-five millimeters of mercury absolute. The vaporizer pressure was maintained by keeping the methanol stripping column under essentially the same absolute pressure. It was necessary to withdraw an average of about 6.5 parts by weight per hour of vaporizer contents to keep the liquid level in the vaporizer from rising.

The temperature at the top of the methanol stripping column under the imposed partial vacuum was about 38.5 degrees centigrade and the temperature at the bottom of the column was about one hundred and forty-four degrees centigrade.

Distillate from the methanol stripping column was continuously fed to the product column which was also operated at an absolute pressure of about two hundred and twenty-five millimeters of mercury. Under this pressure, the temperature in the top of the product column was about 35.5 degrees centigrade, and the bottom temperature was about seventy-eight degrees centigrade. Distillate from the product column was automatically refed to the vaporizer as the recycle methanol stream. The bottom stream from the product column was withdrawn at a rate of about twenty-nine parts by weight per hour. The withdrawal rate was based on maintaining constant level in the "pot" of the product column. This bottom stream material averaged about eighty-seven percent trimethyl phosphite, the remainder being mostly anisole and pentavalent phosphorus-containing impurities. Trimethyl phosphite of greater than about ninety-seven weight percent purity can be readily recovered by distilling this product column bottom stream.

The bottom stream from the methanol stripping column was continuously fed to the phenol column. The phenol column was operated under an absolute pressure of about five millimeters of mercury. A "pot" temperature of about one hundred and thirty-three to one hundred and thirty-eight degrees centigrade was maintained in the phenol column, and the temperature in the top portion of the column was about fifty-eight to sixty-four degrees centigrade. Phenol of about ninety-eight percent purity was obtained as distillate from the phenol column at an average rate of about sixty-four parts by weight per hour. Anisole was the main impurity in this recovered phenol. The bottom stream from the phenol column was withdrawn to maintain a constant "pot" level. The rate of bottom stream withdrawal averaged about seventeen parts by weight per hour. The bottom stream was accumulated until the next reaction batch was made. The bottom stream consisted essentially of trivalent phosphorus-containing compounds and phenol.

The overall yield of trimethyl phosphite from triphenyl phosphite during the operating period was about seventy-eight percent, and about eighty-five percent of the theoretically possible amount of phenol was recovered.

*Example 3.—(Batch reaction, continuous trimethyl phosphite recovery employing a vaporizer pressure of 45 mm. of mercury absolute during a typical 24 hour period of operation)*

This example illustrates operation under conditions similar to those employed in Example 2, with the exception that different temperatures and pressures in the continuous trimethyl phosphite recovery system were used in the instant example. Also in this example the product column distillate was not directly recycled to the vaporizer, but was accumulated and used as a part of the charge to the next batch reaction.

In a typical twenty-four hour period of operation, approximately two thousand, nine hundred and sixty-two parts by weight of triphenyl phosphite, 12.9 parts by weight of sodium methylate, and one thousand, three hundred and two parts by weight of methanol were charged to a reaction vessel. In addition, the accumulated recycle phosphorus stream, about six hundred and eleven parts by weight, and the accumulated recycle methanol stream, about two thousand, five hundred and fifty-one parts by weight (recovered from the previous twenty-four hour operating period of the trimethyl phosphite recovery system), were also charged to the reaction vessel. The contents of the said vessel were stirred to achieve a completely mixed solution. Aside from the slight temperature rise, due to the initial high reaction rate, the contents of the said reaction vessel remained at room temperature. The contents of the said vessel were then used periodically as necessary to refill the feed tank for the vaporizer when the level in the feed tank became low. The mixed feed, prepared as above, was continuously metered to the vaporizer at a rate of about three hundred and ten parts by weight per hour. The liquid "heel" in the vaporizer was maintained at a temperature of about ninety-five to one hundred and five degrees centigrade, and the pressure in the vaporizer was maintained at about forty-five millimeters of mercury absolute. The vaporizer pressure was maintained by keeping the methanol stripping column under essentially the same absolute pressure. It was necessary to withdraw an average of about 4.6 parts by weight per hour of vaporizer contents to keep the liquid level in the vaporizer from rising.

The temperature at the top of the methanol stripping column under the imposed partial vacuum was about ten degrees centigrade, and the temperature at the bottom of the column was about one hundred and five degrees centigrade.

Distillate from the methanol stripping column was continuously fed to the product column. The distillate had a composition of about thirty-three weight percent of trimethyl phosphite in methanol and contained small amounts of anisole and miscellaneous impurities. The product column was operated at atmospheric pressure. Under this pressure, the temperature in the top of product column was about sixty-six degrees centigrade, and the temperature in the bottom portion thereof was about one hundred and ten to one hundred and twelve degrees centigrade. Distillate from the product column was recovered at the rate of about one hundred and twenty-two parts by weight per hour, and was accumulated until the next reaction batch was made. This methanolic distillate had a trimethyl phosphite content of about seven weight percent. The bottom stream from the product column was withdrawn at the rate of about forty-six parts by weight per hour. The withdrawal rate was based on maintaining a constant level in the "pot" in the product column. This bottom stream material averaged about ninety-eight weight percent trimethyl phosphite with the remainder being mostly anisole and pentavalent phosphorus-containing impurities. Trimethyl phosphite of greater than about ninety-nine weight percent purity can readily be recovered by distilling this product column bottom stream.

The bottom stream from the methanol stripping column was continuously fed to the phenol column. The phenol distillation column was operated under an absolute pressure of about five millimeters of mercury. A "pot" temperature of about one hundred and eleven centigrade was maintained in the phenol column, and the temperature in the top of the column was about sixty degrees centigrade. Phenol of about ninety-eight percent purity was obtained as a distillate from the column at an average of about one hundred and seven parts by weight per hour. Anisole was a principle impurity in this recovered phenol. The bottom stream from the phenol column was withdrawn to maintain a constant "pot" level. The rate of bottom stream withdrawal averaged about twenty-two parts by weight per hour. This bottom stream was accumulated until the next reaction batch was prepared. This bottom stream consisted essentially of trivalent phosphorus-containing compounds and phenol. The trivalent phosphorus content of this stream was the calculated molar equivalent to about seventy-six weight percent of diphenyl methyl phosphite.

The overall yield of trimethyl phosphite from triphenyl phosphite was about 91.6 percent, and about 93.4 percent of the theoretically possible amount of phenol was recovered.

During the operation of the process as described above, there were no signs of any problems which would have prohibited further continuous operation.

*Example 4.—(Batch reaction, continuous trimethyl phosphite recovery employing a vaporizer pressure of 45 mm. of mercury absolute for 120 hours of operation)*

Example 4 illustrates operation under the same operating condition as employed in Example 3, but for a much longer operating period.

For a one hundred and twenty hour operating period, once each twenty-four hours, an average of about two thousand, nine hundred and sixty-five parts by weight of triphenyl phosphite, 13.35 parts by weight of sodium methylate, and nine hundred and forty-six parts by weight of methanol were charged to a reaction vessel. In addition, the accumulated recycle phosphorus stream, an average of about six hundred and fifty-eight parts by weight, and the accumulated recycle methanol stream, an average of about three thousand, one hundred and fifty parts by weight, (recovered from the previous twenty-four hour operating period of the trimethyl phosphite recovery system) were also charged to the said reaction vessel. The contents of the reaction vessel were stirred to achieve a homogeneous solution. Aside from the slight temperature rise, due to the initial high reaction rate, the contents of the reaction vessel remained at room temperature. The contents of the reaction vessel was then employed periodically as necessary to refill the feed tank for the vaporizer when the level in the feed tank became low.

The mixed feed, prepared as above, was continuously metered to the vaporizer at an average rate of about three hundred and twenty-two parts by weight per hour. The liquid "heel" in the vaporizer was maintained at a temperature of about ninety-five to one hundred and five degrees centigrade, and the pressure in the vaporizer was maintained at about forty-five millimeters of mercury absolute. The vaporizer pressure was maintained by keeping the methanol stripping column under essentially the same absolute pressure. It was necessary to withdraw an average of about 5.9 parts by weight per hour of the vaporizer contents to keep the liquid level in the vaporizer from rising.

The temperature at the top portion of the methanol stripping column under the imposed partial vacuum was about ten degrees centigrade, and the temperature at the bottom of the column was about one hundred and five degrees centigrade.

Distillate from the methanol stripping column was continuously fed to the product column. This distillate had a composition of about thirty to thirty-four weight percent of trimethyl phosphite in methanol and contained small amounts of anisole and miscellaneous impurities. The product column was operated at atmospheric pressure. Under this pressure the temperature in the top of the product column was about sixty-six degrees centigrade and the temperature in the bottom portion thereof was about one hundred and ten to one hundred and twelve degrees centigrade. Distillate from the product column was recovered at the average rate of about one hundred and thirty-one parts by weight per hour, and was accumulated until the next reaction batch was prepared. This methanolic distillate had an average trimethyl phosphite content of about 7.3 weight percent. The bottom stream from the product column was withdrawn at an average rate of about forty-seven parts by weight per hour. The withdrawal rate was based upon maintaining a constant level in the "pot" of the product column. This bottom stream material averaged about ninety-eight percent trimethyl phosphite, with the remainder being mostly anisole and pentavalent phosphorus-containing impurities. Trimethyl phosphite of greater than about ninety-nine weight percent purity was continuously recovered by distilling this product column bottom stream at about two hundred and fifty millimeters of mercury absolute pressure while using continuous distillation techniques.

The bottom stream from the methanol stripping column was continuously fed to the phenol column. The phenol column was operated under an absolute pressure of about five millimeters of mercury. A "pot" temperature of about one hundred and ten to one hundred and twenty degrees centigrade was maintained in the phenol column, and the temperature in the top of the column was about sixty to seventy degrees centigrade. Phenol of about ninety-eight percent purity was obtained as a distillate from this column at an average rate of about one hundred and eight parts by weight per hour. Anisole was the main impurity in this recovered phenol. The bottom stream from the phenol column was withdrawn to maintain a constant "pot" level. The rate of bottom stream withdrawal averaged about twenty-seven parts by weight per hour. This bottom stream was accumulated until the next reaction batch was prepared. This bottom stream consisted essentially of trivalent phosphorus-containing compounds and phenol. The average trivalent phosphorus content of this stream was the calculated molar equivalent to about sixty-nine weight percent of diphenyl methyl phosphite.

The overall yield of trimethyl phosphite from triphenyl phosphite was about ninety-three percent, and about ninety-four percent of the theoretically possible amount of phenol was recovered.

*Example 5.—(Continuous reaction employing continuous trimethyl phosphite recovery using a vaporizer pressure of 45 mm. of mercury absolute)*

In this example the trimethyl phosphite recovery system was operated under essentially the same conditions as in Example 4; however, the reaction between triphenyl phosphite and methanol in the presence of a catalyst was carried out continuously in the instant example as compared to the batchwise reaction in Example 4. As in Example 4, the trimethyl phosphite recovery system was also operated continuously.

In a typical twenty-four hour operating period, about three thousand, five hundred and fifty-nine parts by weight of triphenyl phosphite and about two hundred and three parts by weight of accumulated recycle phosphorus stream (from the previous twenty-four hour operating period), were mixed together and periodically added to a first feed tank when the liquid level in that tank became low. About one thousand, two hundred and twenty parts by weight of methanol, 13.3 parts by weight of sodium methylate, and two thousand, eight hundred and thirty-two parts by weight of accumulated recycle methanol (from the previous twenty-four hour operating period), where admixed and periodically added to a second feed tank when the liquid level in that tank became low. Liquid streams were continuously metered from the bottom of the "organo-phosphorus" feed tank (the said first feed tank), and the "methanol" feed tank (the said second feed tank), to a mixing T at the rate of about one hundred and fifty-seven parts by weight per hour from the said first feed tank and about one hundred and seventy parts by weight per hour from the said second feed tank.

The combined mixed feed started reacting at the mixing T, and continued reacting in its passage through the transfer line to a pump such that by the time the mixed feed reached the pump, an appreciable extent of transesterification reaction had already occurred. Although heat was neither supplied to nor removed from the reaction occurring in the transfer line, the extent of reaction occurring in the line can readily be increased by supplying heat, or decreased by supplying a line coolant. The temperature of the mixed feed entering the pump was about thirty degrees centigrade.

In order to complete the transesterification reaction, the said mixture was pumped at a pressure of about fifty pounds per square inch (gauge), and under that pressure heated to about one hunderd degrees centigrade, and the residence time of the mixture at one hundred degrees centigrade and fifty pounds per square inch (gauge) was about ten minutes. The length and diameter of the heated pipe were chosen to give a ten minute holding time. After leaving the one hundred degree centigrade zone, the mixture was continuously "flashed" into the vaporizer which was maintained at a pressure of about forty-five millimeters of mercury absolute. In short, the continuous reaction comprised two zones: at atmospheric pressure and relatively low temperature and the other at superatmospheric pressure and relatively high temperature. After leaving the high temperature reaction zone the reaction mixture enters the vaporizer which is maintained at a pressure of about forty-five millimeters of mercury absolute and wherein a substantially total flash vaporization of trimethyl phosphite, methanol, phenol and trivalent phosphorus-containing compounds other than trimethyl phosphite occurs to produce an overhead vapor stream. A very small quantity of vaporization residue which is a highly concentrated mixture of essentially non-volatile, non-reusable by-products is withdrawn from the vaporizer as a bottom stream and is discarded.

The "heel' in the vaporizer was maintained at about ninety-five to one hundred degrees centigrade. The vaporizer pressure was maintained by keeping the methanol stripping column under essentially the same absolute pressure as employed in the vaporizing operation. It was necessary to withdraw an average of about 3.5 parts by weight per hour of vaporizer contents to keep the liquid level in the vaporizer from rising. The temperature at the top of the methanol stripping column was about eleven degrees centigrade, and the temperature at the bottom of the column was about one hundred and seven degrees centigrade.

Distillate from the methanol stripping column was continuously fed to the product column. This distillate had an average composition of about thirty-seven weight percent of trimethyl phosphite in methanol and contained small amounts of anisole and miscellaneous impurities. The product column was operated at atmospheric pressure. Under this pressure, the temperature in the top of the product column was about sixty-six degrees centigrade, and the bottom temperature was about one hundred and ten to one hundred and twelve degrees centigrade. Distillate from the product column was recovered at the rate of about one hundred and twenty-six parts by weight per hour, and was used together with fresh methanol to make the methanolic feed material in the said second feed tank. The methanolic distillate from the product column had a trimethyl phosphite content of about six weight percent. The bottom stream from the product column was withdrawn at a rate of about fifty-four parts by weight per hour. The withdrawel rate was based upon maintaining a constant level in the "pot" of the product column. This bottom stream material averaged about ninety-eight weight percent of trimethyl phosphite, with the remainder being mostly anisole and pentavalent phosphorus-containing impurities. Trimethyl phosphite of greater than about ninety-nine weight percent purity was continuously recovered by distilling this product column bottom stream at about two hundred and fifty millimeters of mercury absolute pressure while using continuous distillation techniques.

The bottom stream from the methanol stripping column was continuously fed to the phenol column. The phenol column was operated under an absolute pressure of about five millimeters of mercury. A "pot" temperature of about one hundred and fourteen degrees centigrade was maintained in the phenol column, and the temperature in the top portion of the column was about sixty to seventy degrees centigrade. Phenol of about ninety-eight percent purity was obtained as a distillate from the column at a rate of about one hundred and twenty-one parts by weight per hour. Anisole was the main impurity in this recovered phenol. The bottom stream from the phenol column was withdrawn to maintain a constant "pot" level. The rate of bottom stream withdrawal was about 9.6 parts by weight per hour. The bottom stream was employed, together with fresh triphenyl phosphite, to prepare the phosphorus-containing feed materials in the said first feed tank. The phenol column stream consisted essentially of trivalent phosphorus-containing compounds and phenol. The trivalent phosphorus content of this stream was the calculated molar equivalent to about sixty weight percent diphenyl methyl phosphite.

For the twenty-four hour operating period described above the overall yield of trimethyl phosphite from triphenyl phosphite was about ninety percent, and about eighty-eight percent of the theoretically possible amount of phenol was recovered. During the operation of the process as described above, there were no signs of any problems which would have prohibited further continuous operation.

Schematic illustration FIGURE I indicates the general process of this invention as described in Example 5.

The basic components of the process of this invention include a low temperature reaction zone 10, a high temperature reaction zone 11, a vaporizer 3, the methanol stripping column (M.S. column) 4, the product column 5 and a phenol column 6. Fresh methanol in source 7, sodium methylate (or other catalyst) in source 9 and accumulated recycle methanolic distillate 12 are admixed in the "methanol" feed tank 2. Triphenyl phosphite in source 8 and the accumulated recycle phosphorus stream 18 are admixed in the "organo-phosphorus" feed tank 1. Streams from feed tanks 1 and 2 are metered in the proper stoichiometric proportion to the low temperature reaction zone 10 and thence to the high temperature reaction zone 11 wherein the transesterification reaction is completed. After leaving the high temperature reaction zone the reaction mixture enters the vaporizer 3 which is maintained at a pressure of about forty-five millimeters of mercury absolute and wherein a substantially total flash vaporization of trimethyl phosphite, methanol, phenol and trivalent phosphorus-containing compounds other than trimethyl phosphite occurs to produce an overhead vapor stream 14. A very small quantity of vaporization residue which is a highly concentrated mixture of essentially non-volatile, non-reusable by-products is withdrawn from the vaporizer as a bottom stream 13 and is discarded.

The vapors 14 from the substantially total vaporization are passed to the methanol stripping column (M.S. column) 4 wherein continuous fractional distillation is carried out to separate the trimethyl phosphite and methanol from the phenol and reusable trivalent phosphorus-containing compounds other than trimethyl phosphite. The trimethyl phosphite and methanol come off the upper portion of the M.S. column as a combined fraction 15 which is passed to the product column 5. The phenol and reusable trivalent phosphorus-containing compounds other than trimethyl phosphite are recovered from the M.S. column 4 as a bottom stream 16 which is passed to the phenol column 6.

Fractional distillation of the trimethyl phosphite-methanol combined distillate 15 from the M.S. column takes place in the product column 5 to produce a methanolic distillate 12 which is recycled to the "methanol" feed tank 2 and a bottom stream 17 of about ninety-eight percent pure trimethyl phosphite.

Fractional distillation of the bottom stream 16 from the M.S. column 4 takes place in the phenol column 6 to produce a phenol distillate 19 of about ninety-eight percent purity and a bottom trivalent phosphorus-containing stream 18 which is recycled to the "organo-phosphorus" feed tank 1.

While the invention has been set forth in relation to particulars and specifics of the examples and drawing above, it should be realized that the invention in its broadest aspects is not limited to the specifics of the above-mentioned examples and drawing. Many other modifications will become apparent to one skilled in the art upon a reading of this basic disclosure; these modifications are considered within the scope of this invention.

I claim:

1. A method of producing trimethyl phosphite which comprises reacting an aryl substituted phosphite selected from the group consisting of aryl dimethyl phosphite, diaryl methyl phosphite, triaryl phosphite and mixtures thereof, wherein the aryl group is selected from the group consisting of phenol, o-cresol, m-cresol, p-cresol, 2,3-dimethylphenol, 2,4-dimethylphenol, 2,5-dimethylphenol, 2,6-dimethylphenol, 3,4 - dimethylphenol, 3,5 - dimethylphenol, 2,3,4 - trimethylphenol, 2,3,5 - trimethylphenol, 2,3,6 - trimethylphenol, 2,4,5-trimethylphenol, 2,4,6-trimethylphenol, 3,4,5-trimethylphenol, 2-ethylphenol, 3-ethylphenol, 4-ethylphenol, 2-n-propylphenol, 3-n-propylphenol, 4-n-propylphenol, 2-isopropylphenol, 3-isopropylphenol, 4-isopropylphenol, 3-ethyl-2-methylphenol, 4-ethyl-2-methylphenol, 5-ethyl-2-methylphenol, 6-ethyl-2-methylphenol, and methanol in the presence of an alkaline transesterification catalyst at a temperature up to and including the boiling point of trimethyl phosphite and methanol under the imposed pressure conditions to produce a transesterification reaction product containing trimethyl phosphite, the said corresponding phenol, methanol, trivalent phosphorus-containing compounds and non-reusable by-products; subjecting said reaction product to continuous flash vaporization to effect the concomitant vaporization of essentially all of the trimethyl phosphite, said phenol, methanol and trivalent phosphorus-containing compounds, avoiding the vaporization of said non-reusable by-products, continuously fractionally distilling said concomitantly vaporized products and continuously recovering substantially pure trimethyl phosphite and said phenol while continuously recycling recovered methanol and recovered trivalent phosphorus-containing compounds to the transesterification reaction.

2. The method of claim 1 wherein the transesterification reaction is conducted intermittently.

3. The method of claim 1 wherein the transesterification reaction is conducted continuously throughout the process.

4. The method of claim 1 wherein an alkaline transesterification catalyst is used, said catalyst selected from the group consisting of sodium, potassium, lithium, sodium hydride, potassium hydride, lithium hydride, sodium borohydride, lithium aluminum hydride, sodium sufide, sodium hydroxide, lithium sulfide, potassium sulfide, sodium methylate, sodium phenolate, potassium phenolate, butyl lithium, phenyl sodium aluminum isodooxide, sodium ethylate, potassium ethylate, sodium decylates, sodium octadecylates, diethyl aniline, quinoline, monododecyl monomethyl amine, pyridine, monododecyl dimethylamine, and the like.

5. The method of claim 1 wherein said non-reusable by-products are intermittently withdrawn during the vaporization step.

6. The method of claim 1 wherein said non-reusable by-products are continuously withdrawn during the vaporization step.

7. A method of producing trimethyl phosphite which comprises reacting an aryl substituted phosphite selected from the group consisting of aryl dimethyl phosphite, diaryl methyl phosphite, triaryl phosphite and mixtures thereof, wherein the aryl group is selected from the group consisting of phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,3,4-trimethylphenol, 2,3,5-trimethylphenol, 2,3,6-trimethylphenol, 2,4,5-trimethylphenol, 2,4,6-trimethylphenol, 3,4,5-trimethylphenol, 2-ethylphenol, 3-ethylphenol, 4-ethylphenol, 2-n-propylphenol, 3-n-propylphenol, 4-n-propylphenol, 2-isopropylphenol, 3-isopropylphenol, 4-isopropylphenol, 3-ethyl-2-methylphenol, 4-ethyl-2-methylphenol, 5-ethyl-2-methylphenol, 6-ethyl-2-methylphenol, 2-ethyl-3-methylphenol, 4-ethyl-3-methylphenol, 5-methyl-3-methylphenol, 6-ethyl-3-methylphenol, 2-ethyl-4-methylphenol, 3-ethyl-4-methylphenol, and methanol in the presence of an alkaline transesterification catalyst at a temperature of from about twenty-five degrees centigrade up to and including the boiling point of trimethyl phosphite and methanol at essentially atmospheric pressure; completing said transesterification reaction by conducting said transesterification at a temperature of from about fifty-five degrees centigrade to about one hundred and twenty-five degrees centigrade at a pressure of from about atmospheric pressure to about one hundred pounds per square inch gauge, to produce a transesterification reaction product containing trimethyl phosphite, phenol, methanol, trivalent phosphorus-containing compounds, and non-reusable by-products; subjecting said reaction product to continuous flash vaporization to effect the concomitant vaporization of essentially all of the trimethyl phosphite, said phenol, methanol, and trivalent phosphorus-containing compounds, while avoiding the vaporization of said non-reusable by-products; continuously fractionally distilling said concomitantly vaporized product and continuously recovering substantially pure trimethyl phosphite and phenol while continuously recycling recovered methanol and recovered trivalent phosphorus-containing compounds to the transesterification reaction.

8. The method of claim 7 wherein the transesterification reaction is conducted intermittently.

9. The method of claim 7 wherein the transesterification is conducted continuously.

10. The method of claim 7 wherein the alkaline transesterification catalyst is used, said catalyst selected from the group consisting of sodium, potassium, lithium, sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium aluminum isodooxide, sodium ethylate, potassium ethylate, sodium decylates, sodium octadecylates, diethyl aniline, quinoline, monododecyl monomethyl amine, pyridine, monododecyl dimethylamine, and the like.

11. A method of producing trimethyl phosphite which comprises reacting an aryl substituted phosphite selected from the group consisting of aryl dimethyl phosphite, diaryl methyl phosphite, triaryl phosphite and mixtures thereof wherein the aryl group is selected from the group consisting of phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,3,4-trimethylphenol, 2,3,5-trimethylphenol, 2,3,6-trimethylphenol, 2,4,5-trimethylphenol, 2,4,6-trimethylphenol, 3,4,5-trimethylphenol, 2-ethylphenol, 3-ethylphenol, 4-ethylphenol, 2-n-propylphenol, 3-n-propylphenol, 4-n-propylphenol, 2-isopropylphenol, 3-isopropylphenol, 4-isopropylphenol, 3-ethyl-2-methylphenol, 4-ethyl-2-methylphenol, 5-ethyl-2-methylphenol, 6-ethyl-2-methylphenol, 2-ethyl-3-methylphenol, 4-ethyl-3-methylphenol, 5-ethyl-3-methylphenol, 6-ethyl-3-methylphenol, 2-ethyl-4-methylphenol, 3-ethyl-4-methylphenol, and methanol in the presence of an alkaline transesterification catalyst at a temperature up to and including the boiling point of trimethyl phosphite, phenol and methanol, under the imposed pressure conditions to produce a transesterification reaction product stream containing trimethyl phosphite, phenol, methanol, trivalent phosphorus-containing compounds, and non-reusable by-products; subjecting said reaction product stream to continuous flash vaporization at a temperature of from about ninety degrees to about one hundred and fifty degrees centigrade under an absolute pressure of from about five to about seven hundred and fifty millimeters of mercury and at an alkaline pH to effect the concomitant vaporization of essentially all of the trimethyl phosphite, phenol, methanol, and trivalent phosphorous-containing compounds, while avoiding the vaporization of said non-reusable by-products; and continuously fractionally distilling said concomitantly vaporized products and continuously recovering substantially pure trimethyl phosphite and phenol while continuously recycling recovered methanol and trivalent phosphorous-containing compounds to the transesterification reaction.

12. The method of claim 11 wherein the transesterification reaction is conducted intermittently.

13. The method of claim 11 wherein the transesterification reaction is conducted continuously.

14. The method of claim 11 wherein an alkaline transesterification catalyst is used, said catalyst selected from the group consisting of sodium, potassium, lithium, sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium aluminum isodooxide, sodium ethylate, potassium ethylate, sodium decylates, sodium octadecylates, diethyl aniline, quinoline, monododecyl monomethyl amine, pyridine, monododecyl dimethylamine, and the like.

15. The method of claim 11 wherein the initial phase of the continuous fractional distillation is conducted at essentially the same pressure as employed in the vaporization.

16. The method of claim 1 wherein the initial phase of the continuous fractional distillation is conducted at a temperature and pressure which minimizes both (a) back transesterification of trimethyl phosphite with said phenol, and (b) loss of trivalent phosphorus-containing compounds due to their conversion to pentavalent phosphorus-containing compounds thereby producing two distillation streams, one comprising essentially trimethyl phosphite and methanol and the other comprising said phenol and trivalent phosphorous-containing compounds.

17. The method of claim 16 wherein the distillation stream of trimethyl phosphite and methanol is subjected to a separate fractional distillation to recover essentially pure trimethyl phosphite.

18. The method of claim 17 wherein an azeotropic agent is employed to recover methanol.

19. The method of claim 18 wherein the azeotroping agent is cyclohexane.

20. The method of claim 16 wherein the distillation stream comprising phenol and trivalent phosphorous-containing compounds is subjected to a separate fractional distillation conducted at sub-atmospheric pressure and at a temperature insuring the avoidance of the degradation of the trivalent phosphorous-containing compounds to thereby recover said essentially pure phenol.

21. The method of continuously producing trimethyl phosphite by transesterification while minimizing the formation of non-reusable by-products and maximizing the formation of trimethyl phosphite said method comprising initially reacting triphenyl phosphite and methanol in the presence of sodium methyl alcoholate at a temperature of about fifty-seven degrees centigrade and atmospheric pressure; then continuously completing said transesterification reaction by conducting the transesterification at a temperature of about one hundred degrees centigrade and a pressure of about forty to sixty pounds per square inch gauge to produce a transesterification reaction product stream containing trimethyl phosphite, methanol, phenol, trivalent phosphorus-containing compounds and non-reusable by-products; subjecting said reaction product stream to a flash vaporization at a temperature of about one hundred degrees centigrade and a pressure of about forty-five millimeters of mercury at an alkaline pH to effect the concomitant vaporization of essentially all of the trimethyl phosphite, phenol, methanol, and trivalent phosphorus-containing compounds, while avoiding the vaporization of said non-reusable by-products; withdrawing the non-reusable by-products, continuously fractionally distilling said concomitantly vaporized product at forty to fifty millimeters of mercury, thereby producing two distillation streams one comprising essentially trimethyl phosphite and methanol and the other comprising essentially phenol and trivalent phosphorus-containing compounds.

References Cited by the Examiner

UNITED STATES PATENTS

| | | | |
|---|---|---|---|
| 2,326,140 | 8/43 | Gzemski | 260—461 |
| 2,353,558 | 7/44 | Gzemski | 260—461 |
| 2,970,166 | 1/61 | Rosin et al. | 260—461 |

OTHER REFERENCES

Landauer et al.: "J. Chem. Soc.," 1953, pp. 2224–2234.

CHARLES B. PARKER, *Primary Examiner.*

LEWIS GOTTS, *Examiner.*